(12) United States Patent
Binsteiner et al.

(10) Patent No.: US 10,458,434 B2
(45) Date of Patent: Oct. 29, 2019

(54) ROTOR STAGE FOR A TURBOMACHINE, ROTOR DRUM, AND ROTOR

(71) Applicant: MTU Aero Engines AG, Munich (DE)

(72) Inventors: Thomas Binsteiner, Munich (DE); Lothar Albers, Munich (DE); Johann Geppert, Tuerkenfeld (DE)

(73) Assignee: MTU Aero Engines AG, Munich (DE)

( * ) Notice: Subject to any disclaimer, the term of this patent is extended or adjusted under 35 U.S.C. 154(b) by 50 days.

(21) Appl. No.: 15/713,847

(22) Filed: Sep. 25, 2017

(65) Prior Publication Data

US 2018/0087534 A1 Mar. 29, 2018

(30) Foreign Application Priority Data

Sep. 23, 2016 (DE) .................. 10 2016 218 285

(51) Int. Cl.
| | |
|---|---|
| *F04D 29/66* | (2006.01) |
| *F04D 29/32* | (2006.01) |
| *F01D 5/02* | (2006.01) |
| *F01D 25/16* | (2006.01) |
| *F01D 11/00* | (2006.01) |

(52) U.S. Cl.
CPC .......... *F04D 29/662* (2013.01); *F01D 5/027* (2013.01); *F01D 25/162* (2013.01); *F04D 29/321* (2013.01); *F01D 11/001* (2013.01); *F05D 2260/602* (2013.01); *Y02T 50/671* (2013.01)

(58) Field of Classification Search
CPC ..... F04D 29/662; F04D 29/324; F04D 29/329
See application file for complete search history.

(56) References Cited

U.S. PATENT DOCUMENTS

| | | | |
|---|---|---|---|
| 4,817,455 A | 4/1989 | Buxe et al. | |
| 5,388,963 A | 2/1995 | Dimick, III et al. | |
| 8,720,259 B1 | 5/2014 | Benjamin et al. | |
| 2013/0104524 A1* | 5/2013 | Kupratis | F02K 3/04 60/226.1 |
| 2014/0147249 A1* | 5/2014 | Little | F01D 25/18 415/68 |
| 2014/0260323 A1 | 9/2014 | Dierksmeier et al. | |
| 2015/0219121 A1* | 8/2015 | King | F16B 43/00 415/119 |
| 2016/0069267 A1 | 3/2016 | Philbrick et al. | |
| 2016/0326877 A1 | 11/2016 | Boewing | |
| 2016/0327065 A1* | 11/2016 | Boewing | F01D 5/027 |
| 2016/0362995 A1* | 12/2016 | Albers | F01D 5/027 |

FOREIGN PATENT DOCUMENTS

| | | |
|---|---|---|
| DE | 102009014846 | 10/2010 |
| EP | 2019185 | 1/2009 |
| EP | 2957792 | 12/2015 |
| EP | 3091179 | 11/2016 |

* cited by examiner

*Primary Examiner* — Long T Tran
(74) *Attorney, Agent, or Firm* — Davidson, Davidson & Kappel, LLC

(57) ABSTRACT

A rotor stage (200) for a turbomachine, including a plurality of rotor blades (9), a rotor main body (7) having at least two rotor arms (3) and a balancing assembly (1) for balancing the rotor stage (200). The rotor arm (3) configured downstream from the rotor main body (7) features the balancing assembly (1). The balancing assembly (1) is configured between the axial end region of the rotor arm (3) and the rotor disk (27) of the rotor main body (7). Furthermore, a rotor drum (17, 18) for a turbomachine and a rotor (1000) for a turbomachine.

14 Claims, 2 Drawing Sheets

ROTOR STAGE FOR A TURBOMACHINE, ROTOR DRUM, AND ROTOR

This claims the benefit of German Patent Application DE102016218285.4, filed Sep. 23, 2016 and hereby incorporated by reference herein.

The present invention relates to a rotor stage for a turbomachine. The present invention also relates to a rotor.

BACKGROUND

Rotors for turbomachines must satisfy a variety of requirements and boundary conditions. For example, it is necessary that individual rotor stages be balanced to be able to be operated at a low rate of wear and with little maintenance, especially at high rotational speeds. Imbalances often occur in individual rotor stages as a function of the manufacturing process and, in particular, can be induced during rotor blade milling. The rotor blades can thereby be manufactured in what is generally referred to as BLISK form or in individual blade form. The imbalances are normally compensated prior to a first operational use by appropriate balancing measures, for example, by static or dynamic balancing.

Furthermore, possible accumulations of oil in cavities in the inner rotor space, such as accumulations of bearing oil, should be able to flow off from the inner rotor space in the case of rotors for turbomachines, for example, in aircraft engine applications, to ensure that cabin air streams are not potentially contaminated by discharges from the compressor. Suitable design approaches are needed to fulfill both requirements.

SUMMARY OF THE INVENTION

It is an object of the present invention to provide a rotor stage for a turbomachine that includes at least a plurality of rotor blades, a rotor main body having at least two rotor arms and, in particular exactly one single balancing assembly for balancing the rotor stage. It is also an object of the present invention to provide a rotor drum and a rotor.

Thus, the present invention provides a rotor stage for a turbomachine, the rotor stage having at least a plurality of rotor blades, a rotor main body having at least two rotor arms and, in particular, at least one balancing assembly for balancing the rotor stage. Viewed in the main through-flow direction, the rotor arm configured downstream of the rotor main body notably features exactly one balancing assembly. When one balancing assembly is used, it balances the entire rotor stage. This means that, viewed in the main through-flow direction, the rotor arm configured upstream of the rotor main body does not feature any further balancing assembly in the specific embodiment of only one balancing assembly of the rotor stage.

The balancing assembly of the downstream rotor arm is configured, on the one hand, between the axial end region (viewed in the main through-flow direction) of the downstream rotor arm and, on the other hand, the rotor disk of the rotor main body.

The inventive rotor drum for a turbomachine includes at least one rotor stage according to the present invention and at least one further rotor stage. The further rotor stage includes at least one blade assembly having a rotor main body and a plurality of rotor blades. The rotor drum according to the present invention has at least one spin-off hole. The spin-off hole is configured radially outwardly from the rotor drum and, furthermore, near the largest radius of an inner contour of the rotor drum.

The inventive rotor for a turbomachine includes at least one rotor stage according to the present invention.

Advantageous further embodiments of the present invention constitute the subject matter of each of the specific embodiments.

Exemplary specific embodiments according to the present invention may include one or more of the features mentioned in the following.

Purely by way of example, turbomachines may be gas turbines. More particularly, a turbomachine is an axial gas turbine, for example, an aircraft gas turbine.

The term "rotor," as used herein, refers to a rotating body in a turbomachine, which rotates about an axis of rotation of the turbomachine during normal operational use. The rotor includes at least one rotor stage. A rotor stage may be referred to as a blade wheel or include a blade wheel. A rotor stage includes at least a plurality of rotor blades and a rotor main body. A rotor stage may include one or more rotor arms. The rotor main body may be referred to as or include a disk, rotor disk, ring, or rotor ring. A rotor may include one or more rotor stages.

A rotor may be installed and mounted in a turbomachine, in particular in a gas turbine. An aircraft engine may be a gas turbine or include a gas turbine. An aircraft engine may include a compressor having a plurality of compressor stages and a turbine having a plurality of turbine stages. Compressor stages and turbine stages may each have rotor stages and stator stages.

The rotor blades of a rotor may be referred to as blades and each have at least an airfoil portion, a root portion and a platform portion. The blades may be connected to the rotor main body separately, for example, form-fittingly by what is generally referred to as a releasable dovetail connection, or integrally. Separate blades may be connected to the rotor main body either releasably and/or form-fittingly and/or in a substance-to-substance bond. An integral connection is, in particular, a material-to-material bond. An integral connection may be fabricated using a generative manufacturing process. A generative manufacturing process may also be referred to as an additive production process or as rapid prototyping. Selective laser sintering (SLS), selective laser melting (SLM) or cold gas spraying are examples of a generative manufacturing process. A rotor main body having blades integrally connected thereto may be referred to as an integrally bladed rotor. An integrally bladed rotor may be what is known as a BLISK (integrally bladed disk) or a BLING (integrally bladed ring). A "blisk" is a rotor design where the disk and the blade may be manufactured from one piece.

The rotor main body may include radially inwardly directed rotor disks and/or axially oriented rotor arms. The radially inwardly directed rotor disks may be referred to as extensions or T-shaped extensions of the rotor blades.

The rotor arms may be referred to as drum members or sections thereof. The rotor is designed or prepared to be directly or indirectly connected to a shaft of the turbomachine. An indirect connection may be via a hub and/or via further rotors. In the case of a direct connection, the rotor may be directly flanged to the shaft.

The term "rotor drum," as used herein, refers to sections of at least two axially interconnected rotor main bodies. In particular, rotor arms may form a rotor drum. A rotor drum may likewise be configured to extend over more than two rotor main bodies, and optionally over a plurality of rotor arms and rotor disks. For example, a plurality of rotor main bodies of a purely exemplary eight-stage compressor in a turbomachine may form one rotor drum.

The terms "inner rotor space" and "outer rotor space," as used herein, refer to the spaces inside and outside of the rotor drum of rotors. Thus, the inner rotor space is essentially bounded radially outwardly by one or more rotor arms. The inner rotor space is essentially bounded axially by rotor disks; generally, a gap being formed between a shaft, to which the rotor drum is directly or indirectly connected, and the rotor disks. The outer rotor space is essentially bounded radially inwardly by one or more rotor arms. The outer rotor space essentially includes the main through-flow passage of the turbomachine. Furthermore, inner stator rings, with or without abradable seals, may be configured between a rotor arm and the main through-flow passage, for example. The inner rotor space and/or the outer rotor space may include a plurality of rotor stages.

Rotor main bodies, axially disposed one behind the other, may be interconnected by rotor arms and/or rotor disks. The connection is, in particular, by a form-fitting connection and/or formed by frictional engagement.

Annular balancing collars may be configured inside of the rotor drum, in particular on the inner side of the rotor arms. The balancing collars may be connected by frictional engagement to the rotor arms. Alternatively or additionally, further balancing devices, such as flanges having balancing weights mounted circumferentially therearound, may be configured inside of the rotor drum.

In several exemplary embodiments of the present invention, the rotor drum, at least in portions thereof, may have a larger inner rotor diameter at the downstream rotor arm of the rotor stage according to the present invention than that at the upstream rotor arm of the rotor stage according to the present invention. To achieve the same balancing result, a lighter or smaller balancing weight may be advantageously used on the rotor arm in the case of a larger inner rotor diameter than in the case of a smaller inner rotor diameter.

In certain embodiments according to the present invention, the rotor main bodies, i.e., a first and a second rotor main body, are prepared for receiving rotor blades to form a first rotor stage including the first rotor main body and a second rotor stage including the second rotor main body.

In certain embodiments according to the present invention, the rotor main bodies are integrally connected to rotor blades. A blade wheel that has a rotor main body having a plurality of peripherally disposed and integrally connected rotor blades may be generally referred to as a "blisk."

In several embodiments of the present invention, the rotor main bodies are connected to the rotor blades form-fittingly, in particular releasably. A form-fitting and releasable connection may be what is generally known as a dovetail connection.

In many embodiments of the present invention, the rotor arm has at least one sealing tip for reducing leakage flows between the rotor and the static components of the turbomachine, in particular the stator vane assembly. The stator vane assembly may be referred to as a stator stage.

In certain embodiments of the present invention, the rotor arm is made from or contains a first material. The balancing ring may be made from or contain a second material. The first material and the second material differ from one another. This advantageously makes it possible, for example, to use a process for shrink fitting the balancing ring onto the rotor arm and/or for removing material from the balancing ring for balancing purposes.

In several embodiments of the present invention, the material of the rotor arm and of the balancing ring is identical.

In many inventive embodiments, the balancing ring has at least one designated or prepared region on the periphery thereof for removing material to balance the rotor.

In several embodiments of the present invention, the first rotor stage has a balancing flange having at least one balancing weight. In particular, the balancing flange has a discontinuous or interrupted contour around the circumference thereof. A continuous contour would be a closed, annular contour, such as a closed balancing ring. A discontinuous contour of the balancing flange prevents bearing oil or some other fluid from collecting in a cavity formed by the same when the rotor rotates as a function of the operating conditions, and the centrifugal force slings the bearing oil outwards against the radially inner wall of the rotor drum inside of the same. Nevertheless, balancing weights distributed over the periphery may be fixed to the balancing flange to compensate for imbalance of the rotor stage.

In certain embodiments of the present invention, the rotor arm has an opening to allow fluids to pass through from the inner rotor space to the outer rotor space. During rotation of the rotor according to the present invention, bearing oil, for example, in particular condensed bearing oil mist, may be spun off from a hub located in the immediate vicinity of the rotor stage, through the opening into the main through-flow passage. The opening may be referred to as a spin-off hole, a spin-off bore, or as an oil spin-off bore.

In many exemplary embodiments of the present invention, the balancing assembly is configured in a region between a radial longitudinal axis of the rotor main body and half of the axial length of the downstream rotor arm. This configuration of the balancing assembly may be referred to as near the disk or near the rotor disk. The total length of the downstream rotor arm is defined as the axial extent of the rotor arm from the radial longitudinal axis of the rotor main body to the axial end of the rotor arm. The next, further downstream rotor stage may be flanged to the axial end or end region of the rotor arm.

In many inventive exemplary embodiments, the balancing assembly is configured in a region between the radial longitudinal axis of the rotor main body and the third of the total length of the downstream rotor arm close to the disk.

In many exemplary embodiments according to the present invention, the rotor arm configured upstream (viewed in the main through-flow direction) of the rotor main body does not have a spin-off hole. When exactly one balancing assembly of the rotor stage is provided (this balancing assembly is configured on the rotor arm downstream from the rotor main body), the rotor arm does not have any balancing assembly upstream of the rotor main body, at least inside of the rotor drum upstream of the rotor main body.

Several exemplary embodiments according to the present invention provide that the inventive rotor stage feature a balancing assembly for balancing imbalances in the immediate vicinity of the center of gravity of the rotor stage. The rotor disk or the rotor ring may be an integrally bladed (BLISK, BLING) or a non-integrally bladed rotor disk or rotor ring. For the balancing thereof, the rotor stage may feature exactly one balancing assembly in the immediate vicinity of the center of gravity thereof.

In many exemplary embodiments according to the present invention, the balancing assembly is configured in an inner rotor space. The balancing assembly may be configured inside of the rotor drum downstream of the rotor disk of the rotor stage according to the present invention.

Several inventive exemplary embodiments provide that the balancing assembly be integrally joined to the rotor arm. Imbalance may be compensated at a balancing assembly integrally joined to the rotor arm, for example, using a material removal process (such as machining), by applying material using substance-to-substance bonding and/or a form-fitting process. Material may be applied by riveting on or flange-mounting weights.

A balancing ring that is integrally connected to the rotor arm may be frictionally connected to the rotor arm by an interference fit. In particular, a balancing ring that is integrally connected to the rotor arm would not be readily mechanically detachable by a threaded connection and/or a non-interference form-fit connection. A balancing ring that is integrally connected to the rotor arm by an interference fit may advantageously be balanced using a material-removal process, such as milling, drilling or grinding, without having to partly or completely remove the balancing ring from the rotor.

In several exemplary embodiments according to the present invention, the balancing assembly is or has a balancing ring.

In several inventive exemplary embodiments of the rotor drum according to the present invention, the rotor arms of the first rotor stage and of the second rotor stage are form-fittingly interconnected. The form-fitting connection may feature a fit, for example, a transition fit or an interference fit.

In several inventive exemplary embodiments of the inventive rotor, a rotor stage according to the present invention is configured as a second rotor stage downstream of a first rotor stage within the rotor. A rotor hub is configured upstream of the first rotor stage. The rotor hub connects the first and second rotor stage to a rotor shaft.

In certain exemplary embodiments according to the present invention of the inventive rotor, the first rotor stage does not have any balancing assembly.

The rotor stage according to the present invention and/or the rotor drum according to the present invention and/or the rotor according to the present invention may be a component of a compressor of a turbomachine. The compressor may be a high-pressure compressor of an aircraft engine.

Many or all of the embodiments of the present invention may have one, several or all of the advantages mentioned above and/or in the following.

The rotor drum according to the present invention advantageously makes it possible to prevent or at least reduce accumulations of oil, for example, accumulations of bearing oil, inside of the rotor drum.

The rotor stage according to the present invention makes it possible to advantageously simplify an imbalance compensation and achieve a better balancing result in comparison to balancing assemblies that are located further away from the center of gravity of the rotor stage. A balancing assembly, for example, a balancing collar that is configured close to the imbalance, is advantageous, particularly in the case of rotor stages or components that are required or intended to be statically, thus not dynamically, balanced because it is possible to keep the imbalance torques/bending within the component to a minimum when an imbalance compensation is performed. A material removal site to achieve balancing (balancing assembly) near the imbalance, thus a short lever arm between the imbalance and the balancing assembly, makes it possible to advantageously reduce possible rotor vibrations.

Due to the use of only one balancing assembly, cost benefits may be derived from the inventive rotor stage having only one balancing assembly. A rotor stage according to the present invention having only one balancing collar and, thus, one possible material removal site (instead of two or more balancing collars) makes it possible for an imbalance compensation to be advantageously performed more simply and economically than in the case of a rotor stage having several balancing collars.

Furthermore, the stress distribution at the axial end region of the rotor arm, for example, at a press fit used for connecting the further rotor stages, may be advantageously reduced by a balancing assembly that is not configured at an axial end region of a rotor arm. An axial end region of the rotor arm does not have any balancing assembly in this end region and thus does not have a material removal option, therefore, in a more uniform stress distribution at the axial end region of the rotor arm as compared to configurations having such options.

The rotor according to the present invention and/or the rotor drum according to the present invention make it advantageously possible to achieve a reproducibility of the balancing result since a possible removal of material to achieve balancing has no effect on a rigidity of a press fit at an axial end region of the rotor arm (for connection to a further rotor stage). A non-inventive balancing assembly at an axial end region of a rotor arm can affect the rigidity of a press fit connection. It is not able to ensure a reproducibility of a balancing result.

The rotor according to the present invention advantageously makes it possible to prevent, or at least reduce, accumulations of oil, for example, accumulations of bearing oil, in the inner rotor space, thus inside of the rotor drum. In particular, a balancing assembly on the downstream rotor arm of the second rotor stage obviates the need for a balancing assembly inside of the rotor drum between the first and second rotor stage. Configuring an oil spin-off bore in or on the rotor drum between the first and second rotor stage allows bearing oil, for example, to flow off from the inner rotor space to the outer rotor space. The balancing of the second rotor stage is displaced, as it were, from the rotor drum between the first and second rotor stage into the rotor drum between the second and third rotor stage. When the rotor is used in an aircraft engine, the flowing off of possible bearing oil from the inner rotor space may at least reduce the potential contamination of cabin air by the same.

BRIEF DESCRIPTION OF THE DRAWINGS

The present invention is explained exemplarily in the following with reference to the accompanying drawings, in which identical reference numerals denote like or similar components. The figures are greatly simplified schematic views in which.

DETAILED DESCRIPTION

Figure 1:
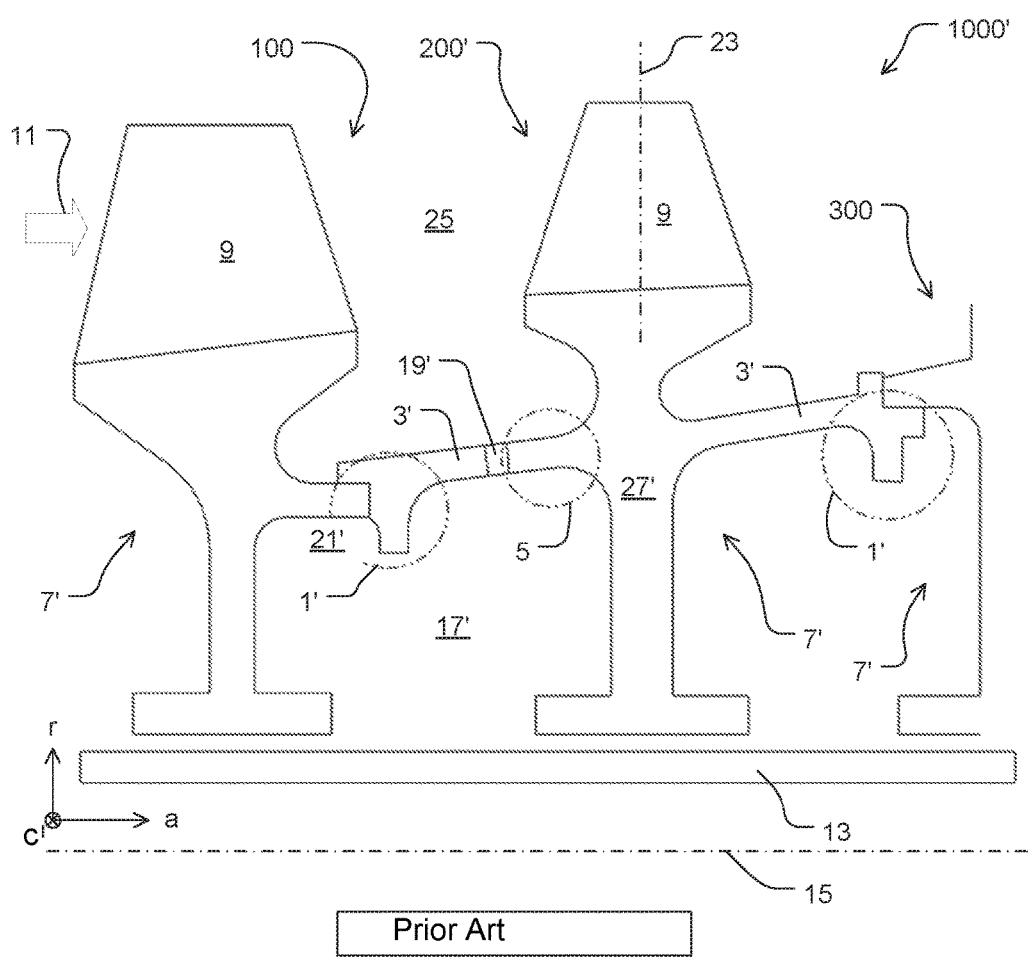
FIG. 1 shows a rotor stage known from the related art that has two balancing assemblies at the rotor arms and one oil cavity.

FIG. 1 shows a second rotor stage 200' known from the related art having two balancing assemblies 1' on rotor arms 3', as well as a first oil cavity 5.

Balancing assemblies 1' are in the form of balancing rings that are integrally connected to rotor arms 3'. An integral design may be referred to as a one-piece type of construction. Furthermore, rotor arms 3' are integral sections of rotor main body 7'. Rotor main bodies 7' are joined to rotor blades 9, for example, by a form-fitting or a material-to-material connection. A plurality of rotor blades are mutually adjacently disposed over circumference u. Rotor blades 9 are circumflowed in main through-flow direction 11 by a flow medium. Together, rotor main body 7' and rotor blades disposed over the circumference form a blade wheel of the turbomachine.

Rotor main bodies 7' are connected to a shaft 13 at a location not shown in FIG. 1. The connection can be configured, for example, upstream of first rotor stage 100 and downstream of third rotor stage 300 by two hubs or cones, for example. Alternatively, rotor main body 7' can be connected by a threaded joint, in particular without a shaft 13, to an axially adjoining component.

The illustrated coordinate system indicates axial direction a that is oriented in main flow direction 11 and in the direction of axis of rotation 15 of shaft 13. Radial direction r extends radially outwardly in the direction of a longitudinal axis 23 of blades 9.

In certain operating states, bearing oil or bearing oil mist (in the following, bearing oil will be used simply for both terms; the term bearing oil may connote bearing oil mist, condensed bearing oil mist or other fluid, or include the same) can leak out from a bearing configured upstream of first rotor stage 100. This bearing oil can collect downstream, in particular in a front rotor drum 17' between first rotor stage 100 and second rotor stage 200'. Depending on the structural design of this front rotor drum 17', the bearing oil can escape from an opening, that can be configured as spin-off bore 19', into main flow passage 25 and be transported away with the working fluid in main through-flow direction 11. As a function of the design, however, cavities can form in front rotor drum 17' in which the bearing oil can collect due to centrifugal force during rotation of rotor stages 100, 200', 300. FIG. 1 shows such a cavity as first oil cavity 5 between spin-off bore 19' and rotor disk 27' of rotor main body 7'. A second oil cavity 21' can form when a balancing ring of upstream balancing assembly 1' of second rotor stage 200' is configured as a closed ring. Oil cavities of this kind can have an adverse effect, especially when the accumulated quantities of oil become large (thus, the cavities are completely or nearly completely filled with bearing oil) and in subsequent operating states, for example, if rotor 1000' is at a standstill or is shut down; and/or in the case of a subsequent restart, accumulated bearing oil can contaminate the cabin air via what are generally referred to as discharges from the compressor, in aircraft engines, for example.

Figure 2:
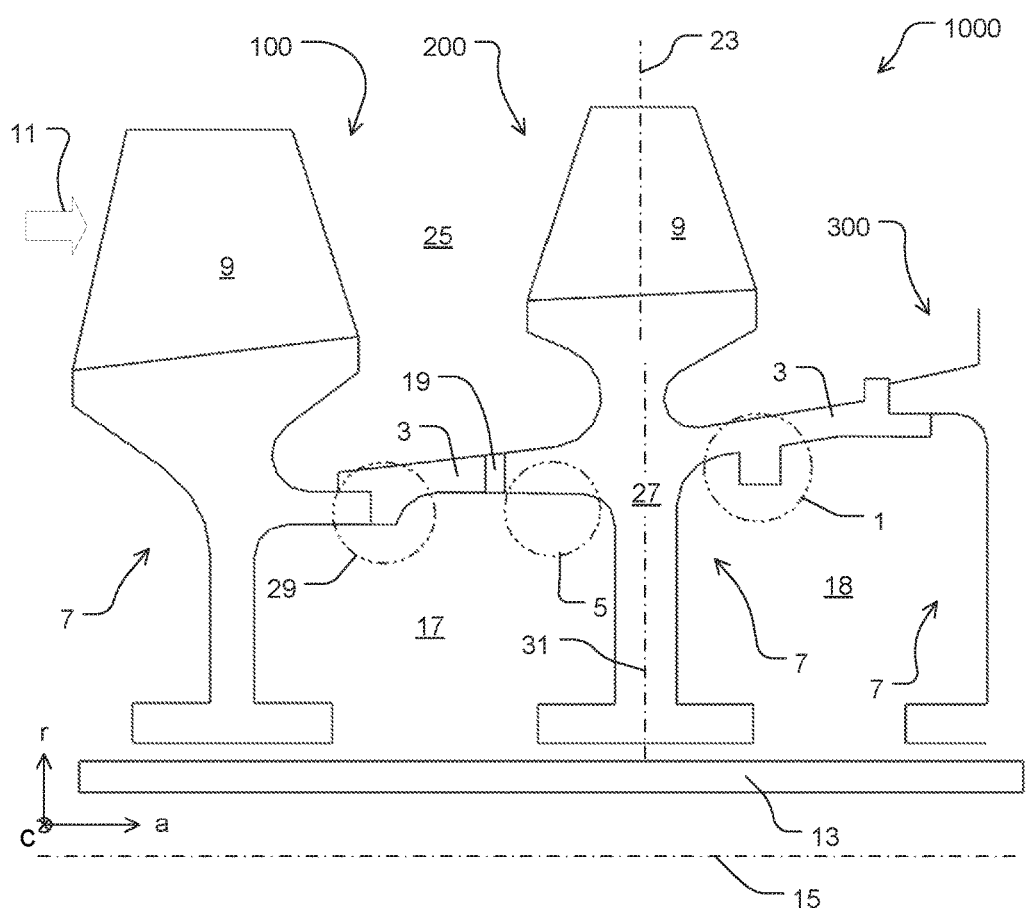
FIG. 2 shows a rotor stage according to the present invention having one balancing assembly between the end region of the downstream rotor arm and the rotor main body.

FIG. 2 shows a second rotor stage 200 according to the present invention having one balancing assembly 1 between the end region of downstream rotor arm 3 and rotor main body 7 or rotor disk 27. Second rotor stage 200 has no second or further balancing assembly (in contrast to the related art shown in FIG. 1).

Furthermore, rotor main body 7 having rotor disk 27 and upstream rotor arm 3 is structurally designed to not allow any cavities to form for possible oil accumulations within front rotor drum 17. Spin-off bore 19 (may be referred to as oil spin-off bore) is configured close to the radially outermost diameter of front rotor drum 17, so that possible bearing oil in front rotor drum 17 is directly and immediately expelled into main through-flow passage 25 in response to rotation of rotor 1000 during operation of the turbomachine and transported away with the main flow in main through-flow direction 11. On the one hand, the design of radially inner contour of upstream rotor arm 3 of second rotor stage 200 according to the present invention between spin-off bore 19 and rotor disk 27 is optimized to allow bearing oil to flow off through spin-off bore 19 at least substantially as a function of centrifugal force. On the other hand, the form-fitting connection of upstream end region 29 of rotor arm 3 does not have any radially inwardly directed balancing collar that could cause or form a cavity for bearing oil. In accordance with the related art (FIG. 1, second oil cavity 21'), such cavities can lead to accumulations of oil in rotor drums 200'.

Balancing assembly 1 is designed to be integrally connected to downstream rotor arm 3. In particular, an integral connection is a one-piece connection. A one-piece connection may be produced using a forging method, in particular lathing and/or milling, or a casting method, alternatively, using a generative manufacturing process, for example, laser sintering, or a material-to-material (synonym for substance-to-substance) process or some other process. Rotor arm 3 and the balancing ring of balancing assembly 1 may be fabricated from the same or different materials.

The illustrated end regions of inventive second rotor stage 200 of rotor arms 3 are form-fittingly connected to upstream adjoining rotor stage 100, as well as to downstream adjoining rotor stage 300. Alternatively, these connections may be configured singly or in multiples as other types of connections, for example, as flange joints, that may be screw-coupled, or as other alternatives. The form-fitting connection illustrated purely exemplarily may, in particular feature fits.

Rotor main bodies 7 are joined to rotor blades 9, for example, by a form-fitting or a material-to-material connection. A plurality of rotor blades are mutually adjacently disposed over circumference u. Rotor blades 9 are circumflowed in main through-flow direction 11 by a flow medium. Together, rotor main body 7 and rotor blades disposed over the circumference form a blade wheel of the turbomachine.

The blade wheel having integrally connected blades 9 and rotor main body 27 may be designed as what is known as a BLISK (bladed disk) or BLING (bladed ring).

The specific embodiment of inventive rotor stage 200 shown in FIG. 2 is designed, in particular for static balancing. To statically balance rotor stage 200, a balancing collar in a balancing assembly 1 suffices for balancing rotor stage 200. This one balancing assembly 1 is advantageously configured on downstream rotor arm 3, so that no balancing assembly is needed at upstream rotor arm 3. Thus, an upstream balancing assembly, especially in the case of a radially inner assembly on rotor arm 3, thus within front rotor drum 17, could lead to accumulations of oil.

Furthermore, balancing assembly 1 is configured in the immediate vicinity of rotor disk 27. An imbalance of rotor stage 200 may occur, in particular in the area of rotor disk 27. The axial position of greatest imbalance is often located near the center of gravity of rotor stage 200 that resides in the area of the longitudinal axis (in the radial direction) of rotor main body 27 and/or in the area of the longitudinal axis of blades 23.

Balancing assembly 1 configured in the immediate vicinity of rotor disk 27 makes it advantageously possible to prevent substantial imbalance torques and/or bending of rotor arm 3 that could arise in the case of configurations of balancing assembly 1 further away from rotor disk 27 (due to the then longer lever). Due to the shorter lever (relative to the center-of-gravity plane in the area of the longitudinal axis of rotor main body 31), this balancing assembly 1 configured in the immediate vicinity of rotor disk 27 may provide a balancing result that, in terms of possible rotor vibrations, is optimized over balancing assemblies having a longer lever.

In principle, rotor stages or other rotating components may be statically or dynamically balanced. In the case of a dynamic balancing, two planes or balancing assemblies are necessary to be able to perform an imbalance compensation.

LIST OF REFERENCE NUMERALS a axial; axial direction
r radial; radial direction
u circumferential direction
1000 rotor
100 first rotor stage
200, 200' second rotor stage
300 third rotor stage
1, 1' balancing assembly
3, 3' rotor arm
5 first oil cavity
7, 7' rotor main body
9 rotor blade
11 main through-flow direction
13 shaft
15 axis of rotation
17, 17' front rotor drum
18, 18' rear rotor drum
19, 19' spin-off bore
21' second oil cavity
23 longitudinal axis of the blade
25 main flow passage; main through-flow passage
27, 27' rotor disk
29 form-fitting connection of the upstream end region of the rotor arm
31 longitudinal axis in the radial direction of rotor main body

The invention claimed is:

1. A rotor stage for a turbomachine comprising:
a plurality of rotor blades;
a rotor main body having an upstream rotor arm and a downstream rotor arm and a balancing assembly for balancing the rotor stage, and having a rotor disk between the upstream rotor arm and the downstream rotor arm;
wherein the downstream rotor arm has the balancing assembly, the balancing assembly being configured between an axial end region of the downstream rotor arm and the rotor disk, wherein the upstream rotor arm includes a spin-off hole.

2. The rotor stage as recited in claim 1 wherein the balancing assembly is configured in an axial region between a radial longitudinal axis of the rotor main body and half of an axial length of the downstream rotor arm.

3. The rotor stage as recited in claim 1 wherein the balancing assembly is configured in a rear rotor drum.

4. The rotor stage as recited in claim 1 wherein the balancing assembly is integrally connected to the downstream rotor arm.

5. The rotor stage as recited in claim 1 wherein the balancing assembly includes a balancing ring.

6. The rotor stage as recited in claim 1 wherein the downstream rotor arm includes a first material, the balancing ring being made from a second material, the first material and the second material differing from one another.

7. The rotor stage as recited in claim 1 wherein the rotor main body is integrally connected to the rotor blades.

8. A rotor drum for a turbomachine, the rotor drum comprising:
a rotor stage for a turbomachine including a plurality of rotor blades; a rotor main body having an upstream rotor arm and a downstream rotor arm and a balancing assembly for balancing the rotor stage, and having a rotor disk between the upstream rotor arm and the downstream rotor arm; wherein the downstream rotor arm has the balancing assembly, the balancing assembly being configured between an axial end region of the downstream rotor arm and the rotor disk; and
a further rotor stage including at least one blade assembly having a further rotor main body and a plurality of rotor blades, a front rotor drum having at least one spin-off hole, the spin-off hole being configured radially outwardly and near a largest radius of an inner contour of the front rotor drum.

9. The rotor drum as recited in claim 8 wherein the rotor stages are rotor compressor stages.

10. The rotor drum as recited in claim 8 wherein the upstream or downstream rotor arm of the at least one rotor stage is form-fittingly interconnected with a further rotor arm of the further rotor stage.

11. A rotor for a turbomachine, the rotor comprising at least one rotor stage as recited in claim 1.

12. A rotor for a turbomachine, the rotor comprising the rotor drum as recited in claim 8.

13. The rotor as recited in claim 12 wherein the further rotor stage is an upstream first rotor stage and further comprising a rotor hub upstream of the first rotor stage.

14. The rotor as recited in claim 12 wherein the further rotor stage is an upstream first rotor stage, the first rotor stage not having any balancing assembly.

* * * * *